United States Patent [19]

Bechlher et al.

[11] Patent Number: 5,058,374
[45] Date of Patent: Oct. 22, 1991

[54] INJECTOR

[75] Inventors: Bryan L. Bechlher, Leamington Spa; Arthur B. Griffin, Leicester, both of England

[73] Assignee: Rolls-Royce plc, London, England

[21] Appl. No.: 507,483

[22] Filed: Apr. 11, 1990

[30] Foreign Application Priority Data

May 18, 1989 [GB] United Kingdom ............... 8911455

[51] Int. Cl.⁵ .............................................. F02C 3/30
[52] U.S. Cl. .................................. 60/39.55; 431/190
[58] Field of Search ................. 60/39.05, 39.55, 39.53, 60/39.59; 431/190

[56] References Cited

U.S. PATENT DOCUMENTS

| | | | |
|---|---|---|---|
| 4,025,282 | 5/1977 | Reed et al. | 431/90 |
| 4,041,699 | 8/1977 | Schelp | 60/39.59 |
| 4,327,547 | 5/1982 | Hughes et al. | 60/39.55 |
| 4,337,618 | 7/1982 | Hughes et al. | 60/39.55 |
| 4,948,055 | 8/1990 | Belcher et al. | 60/39.55 |

FOREIGN PATENT DOCUMENTS 278790  10/1927  United Kingdom .

Primary Examiner—Louis J. Casaregola
Attorney, Agent, or Firm—Cushman, Darby & Cushman

[57] ABSTRACT

An injector which is suitable for the injection of fuel and steam into the combustion apparatus of a gas turbine engine. The injector defines a substantially circular cross-section chamber having upstream and downstream ends through which steam operationally flows. Steam is supplied to the upstream end of the chamber in such a manner that it is urged into a vortex as it passes through the chamber. The downstream end of the chamber is outwardly flared so that the steam flow is exhausted from the injector in a genenrally conical configuration.

4 Claims, 2 Drawing Sheets

INJECTOR

This invention relates to an injector and in particular to a fuel and steam injector suitable for use with a gas turbine engine.

The cycle performance of gas turbine engines which are intended for industrial use can be improved by the injection of steam into the combustion apparatus of the engine. Steam injection can also bring about increases in engine output power.

One convenient way of injecting steam into the combustion apparatus of turbine engine is to utilize injectors which are capable of injecting both fuel and steam into the combustion apparatus interior. For reasons of combustion efficiency and the minimizing of the formation of the oxides of nitrogen in the primary combustion zone of the combustion apparatus, the steam is desirable injected into the combustion apparatus interior in a generally conical configuration. Conventionally such a conical configuration is achieved by the use of an injector which has an appropriately shaped pintle positioned in a flared steam outlet duct. While the provision of such a pintle can bring about the desired conical steam discharge configuration, there is a tendency for the pintle to be damaged through its overheating.

A further problem sometimes encountered in the injection of steam into gas turbine engine combustion apparatus is that the steam supplied to the engine can be at very high velocities due to the very limited space in the vicinity of the fuel injectors. The steam has to be turned through an angle of ninety degrees or so within the fuel injector prior to entering the combustion apparatus and this can result in energy losses within the injector and also a mal-distribution of the steam flow as it exits the fuel injector.

It is an object of the present invention to provide a injector for fuel and steam discharge which provides a substantially conically configured evenly distributed steam discharge without the use of a pintle and which incurs reduced steam energy losses within the injector.

According to the present invention, an injector suitable for the injection of both fuel and steam into combustion apparatus comprises a body adapted to receive flows of fuel and steam and direct those flows of fuel and steam into said combustion apparatus, said injector defining a substantially circular cross-section first chamber through which said steam operationally flows, said first chamber having upstream and downstream ends with respect to the flow of steam therethrough, said injector being so configured that said steam flow is directed into the upstream end of said first chamber in such a manner as to be urged into a vortex flow through said first chamber the axis of which vortex is generally coaxial with the axis of said first chamber, the downstream end of said first chamber being outwardly flared so that said steam flow exhausted into said combustion apparatus is of substantially conical form.

The invention will not be described, by way of example, with reference to the accompanying drawings in which.

Figure 1:
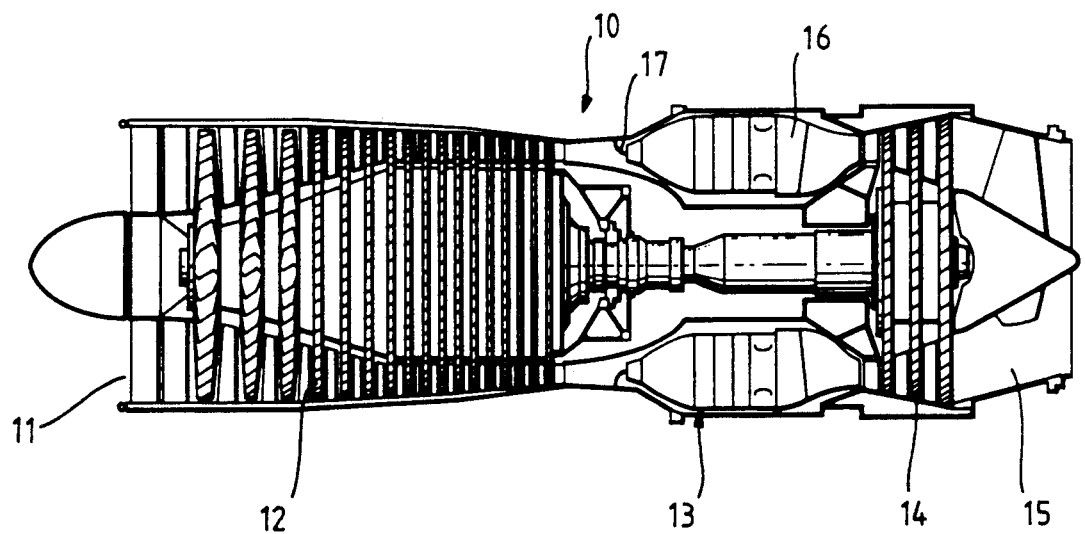
FIG. 1 is a sectioned side view of a gas turbine engine incorporating an injector in accordance with the present invention.

With reference to FIG. 1, a gas turbine engine generally indicated at 10 is of conventional construction and comprises, in axial flow series, an air intake 11, an axial flow compressor 12, combustion equipment 13, a turbine 14 and exhaust nozzle 15. The engine functions in the conventional manner whereby air drawn in through the air intake 11 is compressed in the compressor 12 before being mixed with fuel and the mixture combusted in the combustion equipment 13. The resultant combustion products then expand through, and drive, the turbine 14, which is drivingly connected to the compressor 12 before being exhausted through the exhaust nozzle 15. The exhaust gases may then be used to drive a power turbine (not shown).

The combustion equipment 13 comprises an annular array of similar combustion chambers 16, each of which is provided at its upstream end with a fuel and steam injector 17. It will be appreciated that although the gas turbine engine 10 is provided with an array of individual combustion chambers 16, it could, alternatively be provided with a single, annular combustion chamber.

Figure 3:
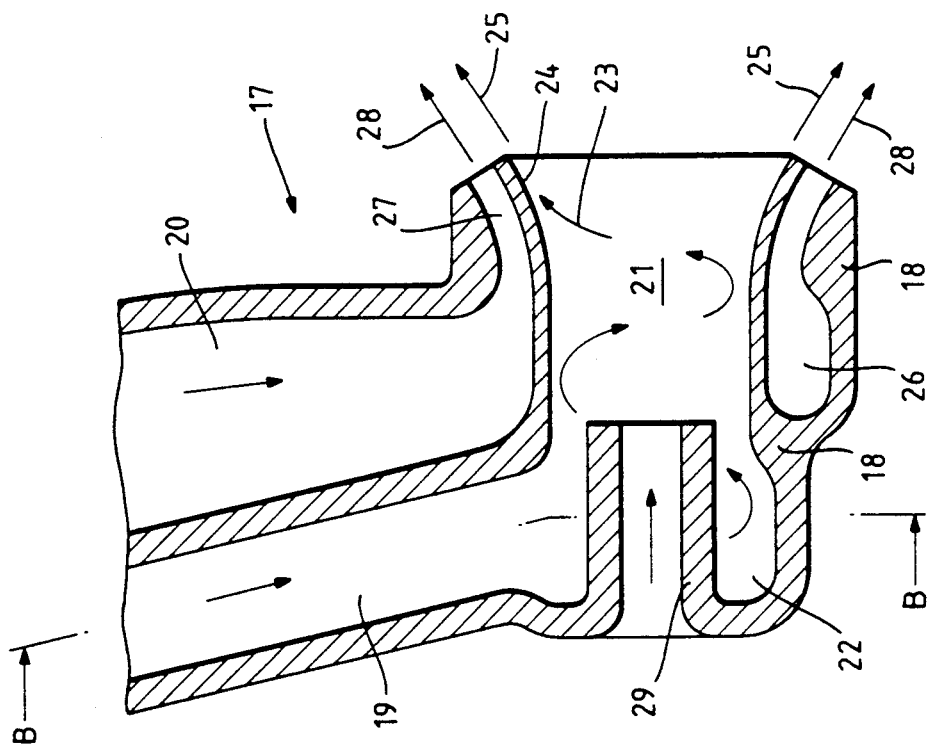
FIG. 3 is a view on section line C—C of FIG. 2.
Figure 2:
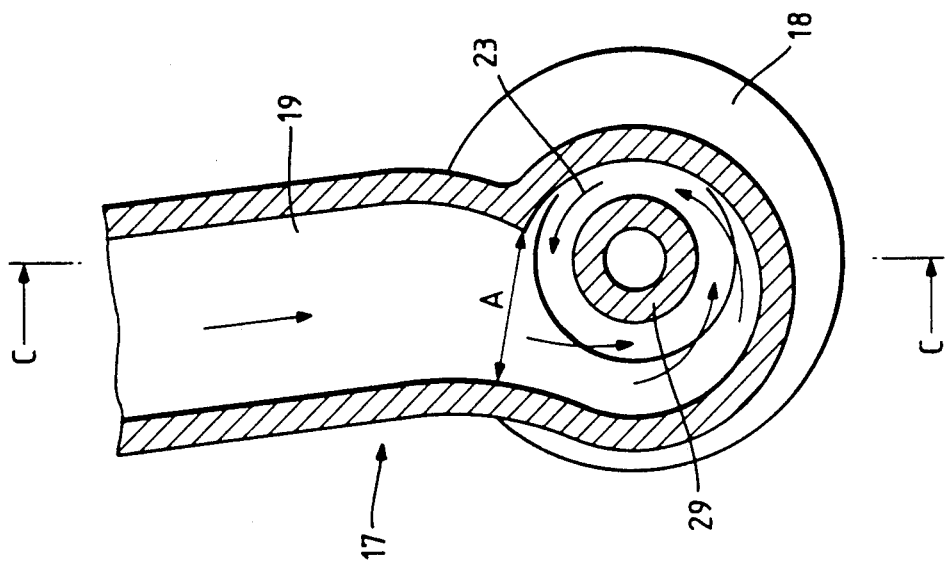
FIG. 2 is a view on section line B—B of FIG. 3 of an injector in accordance with the present invention.

Details of the construction of each injector 17 can be seen if reference is now made to FIGS. 2 and 3.

The injector 17 comprises a body 18 to which two fluid supply pipes 19 and 20 are attached and in fact the fluid supply pipes 19 and 20 constitute the sole means of support for the body 18. The first pipe 19 is upstream of the second pipe 20 with regard to the gas flow through the engine 10 i.e. is located on the left hand side of the fuel injector 17 when viewed in FIG. 3. The first pipe 19 is, in operation, supplied with steam, and directs that steam to the body 18. The second pipe 20 is, in operation, supplied with fuel, either liquid or gaseous, and similarly directs that fuel to the body 18.

The body 18 is hollow so as to define a substantially circular cross-section chamber 21 into the upstream end 22 of which steam from the first pipe 19 is directed. The outlet of the pipe 19 is off-set from the longitudinal axis of the chamber 21 so that steam entering the chamber 21 is urged into a vortex flow through the chamber 21 as indicated by the arrows 23. In order to ensure that steam entering the chamber 21 is of the correct pressure, the pipe 19 cross-sectional area is reduced to a minimum area A at its outlet into the chamber 21.

The steam proceeds to flow in a vortex through the chamber 21 until it reaches the outwardly flared downstream end 24 of the chamber 21. The flared configuration of the chamber downstream end 24 causes the steam to exhaust therefrom in a generally conical configuration as indicated by the arrows 25.

Fuel from the pipe 20 is directed into an annular chamber 26 within the body 18 which is coaxial with the chamber 21. The downstream end 27 of the annular chamber 26 is outwardly flared to the same extent as the downstream end of the chamber 21 so that fuel is exhausted from the annular chamber 26 in a generally conical configuration as indicated by the arrows 28. Thus conical sprays of the same general configuration of fuel and steam are exhausted adjacent each other from the downstream end of the injector body 18. This ensures that both the fuel and steam are directed into the primary combustion zone (not shown) of the combustion chamber 16. Consequently effective use is made of the steam in ensuring enhanced cycle performance and increased power output of the engine 10. Moreover the steam is effective in reducing the amount of nitrous and nitric oxide formation within the combustion equipment 13.

The vortex flow of the steam through the chamber 21 brings about certain important benefits. Specifically a uniform steam flow distribution at the outlet 24 is achieved, and a conical steam discharge in the same direction of fuel discharge is achieved without the use of a central pintle at the downstream end of the chamber 21. Moreover the direction of steam flow through the pipe 19 is turned from an essentially radial direction to an axial direction without incurring heavy flow losses and the inevitable mal-distribution of the steam flow which would result from this.

At the upstream end of the fuel injector body 18 there is provided a duct 29 which permits a flow of air into the chamber 21. If the fuel injector is operating on fuel alone without a steam supply, which may be necessary under certain circumstances, the air flow through the duct 29 provides a supplementary air supply for combustion and also provides a purging flow of air to prevent combustion products flowing into the steam pipe 19.

Although the present invention has been described with reference to an injector 17 in which fuel and steam are exhausted separately from the injector body 18, it may be desirable under certain circumstances to provide mixing of the fuel and steam prior to their exhaustion from the injector body 18. This could be achieved by directing fuel into the chamber 21 in a similar manner to that in which steam is directed into the chamber 21. The fuel would then be urged into a vortex with the steam so that mixing of the steam and fuel would take place within the chamber 21 and a steam and fuel mixture exhausted in a generally conical configuration from the chamber downstream end 24.

Alternately if such mixing is not desired the fuel could be delivered to the annular chamber 26 in such a manner that it flows in a vortex within the chamber 26. This could be achieved by arranging that the outlet of the fuel supply pipe 20 is off-set from the longitudinal axis of the annular chamber 26.

We claim:

1. An injector suitable for the injection of both fuel and steam into combustion apparatus comprising a body adapted to receive separate flows of fuel and steam and direct those flows of fuel and steam into said combustion apparatus, said injector defining a substantially circular cross-section first chamber through which steam operationally flows and an annular second chamber defined around said first chamber, said first chamber having a longitudinal axis and upstream and downstream ends with respect to the flow of steam therethrough, said injector being so configured that said steam flow is directed into the upstream end of said first chamber at a location off-set from the longitudinal axis of said first chamber in such a manner as to be urged through a duct which is so positioned as to direct the steam flow generally tangentially into the first chamber so as to generally follow a vortex path through said first chamber, the axis of said vortex being generally coaxial with the longitudinal axis of said chamber, the downstream end of said first chamber being outwardly flared so that said steam flow exhausted into combustion apparatus is of substantially conical form, said second chamber being adapted to receive said fuel flow and to exhaust the fuel flow into said combustion apparatus.

2. An injector as claimed in claim 1 wherein said second chamber is adapted to exhaust said fuel flow into said combustion apparatus adjacent the downstream end of said first chamber in a flow which is of generally conical configuration to correspond with said generally conical configuration of said steam flow.

3. An injector as claimed in claim 1 wherein said first chamber is provided with an air flow inlet at its upstream end.

4. An injector as claimed in claim 1 wherein said injector is adapted for use in the combustion apparatus of a gas turbine engine.

* * * * *